(12) United States Patent
Davidson et al.

(10) Patent No.: US 6,444,301 B1
(45) Date of Patent: *Sep. 3, 2002

(54) LABELS

(75) Inventors: Paul Malcolm Mackenzie Davidson; Rebecca Karen Govier, both of Swindon; Helen Ann Biddiscombe, Bridgwater; Marc Fritz Manfred Ott, Swindon, all of (GB)

(73) Assignee: Hoechst Trespaphan GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,188

(22) Filed: Mar. 18, 1998

(30) Foreign Application Priority Data

Mar. 18, 1997 (GB) ................................................ 9705509

(51) Int. Cl.⁷ ........................... B32B 5/22; B32B 27/06; B32B 27/32; B32B 31/18; B32B 31/30
(52) U.S. Cl. ............................... 428/315.5; 428/304.4; 428/308.4; 428/315.9; 428/318.4; 428/319.9; 428/500; 428/515; 428/516; 428/523; 428/910; 264/138; 264/152; 264/153; 264/157; 264/288.4; 264/290.2; 264/297.4; 156/244.11; 156/244.18; 156/250; 156/285
(58) Field of Search ........................... 428/304.4, 308.4, 428/315.5, 315.9, 500, 515, 910, 319.3, 319.7, 319.9, 516, 523; 264/138, 152, 153, 157, 288.4, 290.2, 297.4; 156/244.11, 244.24, 246, 250, 252, 253, 244.18, 285

(56) References Cited

U.S. PATENT DOCUMENTS

| 3,963,851 | A | * | 6/1976 | Toyoda ........................ 428/305 |
| 4,386,129 | A | * | 5/1983 | Jacoby ........................ 428/215 |
| 4,960,637 | A | * | 10/1990 | Biczenczuk ............... 428/314.4 |
| 5,118,566 | A | | 6/1992 | Wilhelm et al. ............. 428/339 |
| 5,176,953 | A | | 1/1993 | Jacoby et al. ............ 428/315.5 |
| 5,231,126 | A | | 7/1993 | Shi et al. |
| 5,236,963 | A | * | 8/1993 | Jacoby et al. .................. 521/92 |
| 5,317,035 | A | * | 5/1994 | Jacoby ........................ 521/143 |
| 5,527,601 | A | * | 6/1996 | Crighton et al. ......... 428/316.6 |
| 5,594,070 | A | * | 1/1997 | Jacoby et al. .................. 525/88 |
| 5,985,075 | A | * | 11/1999 | Freedman .................... 156/229 |
| 6,235,823 | B1 | * | 5/2001 | Ikeda et al. .................. 524/229 |

FOREIGN PATENT DOCUMENTS

| EP | 0 557 721 | | 9/1993 |
| EP | 0 632 095 | | 1/1995 |
| EP | 0632 095 A | * | 1/1995 |

OTHER PUBLICATIONS

Journal Polymer (vol. 35, No. 16, pp. 3442–3445, 1995).
Journal Polymer (vol. 36, No. 13, pp. 2523–2530, 1995).

* cited by examiner

*Primary Examiner*—Vivian Chen
(74) *Attorney, Agent, or Firm*—Powell Goldstein Frazer & Murphy LLP

(57) ABSTRACT

Polymeric films including a layer of propylene resin having microvoids therein, the microvoids having been formed by stretching a web containing the beta-form of polypropylene, have shown low static cling when being unwound from rolls in labelling operations and also during destacking of preformed labels. The invention provides labels formed from such films.

20 Claims, No Drawings

LABELS

BACKGROUND OF THE INVENTION

1. Field of the Invention

This invention concerns labels made from polyolefin films, and a method of making such labels.

2. Description of Related Art

Polyolefin films are increasingly being used to produce labels, both as a substitute for paper labels and to exploit the inherent properties of polyolefin films such as their printability and their ability to be molded into and to adhere to the surfaces of containers as they are being formed. Since polyolefins used to form such films are usually inherently clear and colorless, films formed from them are often rendered opaque and/or colored white, thereby producing a label which is itself opaque.

A variety of techniques have been proposed for making polyolefin films opaque, one being the inclusion of a pigment, for example, titanium dioxide, and another being the formation of microvoids within the films which scatter light and thereby impart opacity to the films. The use of titanium dioxide has the advantage that it generally provides a high degree of opacity but this is accompanied by its additional cost and significant amounts are required in order to obtain the desired opacity. Microvoids have the advantage that they can be formed relatively easily in polypropylene, but the degree of opacity which can be achieved is often insufficient for labels. In addition, the amount of voiding agent which can be added to polypropylene, for example, is limited by the reduction in strength of the resulting voided film. Combinations of a pigment such as titanium dioxide and a voiding agent such as chalk in polypropylene films have therefore been used in an attempt to improve the opacity of labels made from polypropylene.

In certain end uses of labels made from polyolefin films, for example, in in-mold labelling, the film is pre-cut and is converted into individual labels which are then formed into a stack from which individual labels are removed as they are required. However, the problem with removing individual labels from a stack is that they are often difficult to separate from each other as a result of static electricity between adjacent labels, and this often increases as more labels are removed from the stack.

The build up of static charge is also a problem if polyolefin films are cut and fed at high speed from reels of films, for example, in wrap-around or cut-in-place labelling, or pre-formed labels on a release web, for example, in self-adhesive labelling.

The undesirable effects of static charge build up can be reduced, for example, by adding relatively large amounts of antistatic agents to the films, but doing so can also lead to other undesirable physical effects such as reducing print adhesion to the films.

SUMMARY OF THE INVENTION

Accordingly, it is an object of the invention to provide labels formed from polypropylene polymers that have advantageous properties. It is also an object of the invention to provide methods of making and using such labels.

In accordance with these and other objects, there has been provided a polymeric label formed from a film comprising a layer of propylene polymer resin having microvoids therein, the microvoids having been formed by stretching a web containing the beta-form of polypropylene.

In accordance with the present invention, there is also provided a method of making a label including:

(a) forming a film comprising the beta-form of polypropylene;

(b) stretching the film to form microvoids; and (c) cutting the film into labels.

In accordance with the present invention, there is also provided a polymeric label formed from a film comprising an opaque layer of propylene polymer that does not include void-initiating particles or opacifying pigments.

Further objects, features, and advantages of the invention will become apparent from the detailed description of preferred embodiments that follows.

DETAILED DESCRIPTION OF PREFERRED EMBODIMENTS

According to the present invention, there is provided a label formed from a film comprising a layer of polypropylene-based resin having microvoids therein, the microvoids having been formed by stretching a web containing the beta-form of polypropylene.

"Polypropylene-based resin" or "polypropylene-based polymer" and "polypropylene" are used synonymously. These terms shall mean polymers containing at least 50% by weight, based on the weight of the polymer, of propylene units.

"Web" shall mean a sheet-like extrudate resulting from extruding the respective polymer melt or melts through a slot die and subsequent cooling of the melt to form the unoriented film.

"Base layer" shall mean either "the layer" in case of a monolayered film or the thickest layer, generally being the innermost, central layer of the multilayer structure.

"Beta form of polypropylene" shall mean that crystalline modification of polypropylene which has a lower melting point and a lower density than the common alpha form of propylene.

"Microvoids" shall mean the hollow vacuoles in the polymer matrix reducing the density of the oriented polypropylene film wherein the reduced density is lower than that of a corresponding film without any voids.

Labels formed from polypropylene films with microvoids therein and produced by stretching a web containing the beta-form of polypropylene have been found to destack readily without the addition of an antistatic agent. In order to reduce static cling still further, an antistatic agent can, if desired, be added to the films to reduce static cling between labels in a stack or static generated on unwinding reels of the films. But in general the amount of antistatic agent can be kept to levels typically used for packaging films. Any desired antistatic agent can optionally be used in the labels.

The beta-form of polypropylene is relatively unstable compared with the corresponding alpha-form under the conditions normally used to produce polypropylene films. Thus, when melts of polypropylene are extruded and then cooled to form a polymeric film, which may then subsequently be stretched, the alpha-form of polypropylene tends to predominate. However, it is known to produce films using polypropylene containing high concentrations of the beta-form of polypropylene by mixing polypropylene containing a high proportion of the alpha-form with a suitable nucleating agent which induces the formation of high concentrations of the beta-form when it is molten and subsequently cooled.

One example of such a process is described in U.S. Pat. No. 4,386,129 which is incorporated herein be reference, in which a variety of so-called beta-nucleators are dispersed in polypropylene following which films are produced therefrom by melting and subsequent cooling, the crystallinity of the resulting cast films being controlled by appropriate adjustment of the cooling conditions. Selective extraction of the beta-form of the polypropylenes from the films leaving a matrix of the alpha-form is then used to impart porosity to the films.

U.S. Pat. No. 5,231,126, which is incorporated herein by reference, describes the use of two component mixtures of beta-nucleating agents to produce microporous films by mono- or biaxial stretching cast polypropylene webs containing a high concentration of the beta-form of polypropylene resulting from the use of the mixture of nucleating agents. It is believed that the porosity results from voids induced by the change of the beta-form into the alpha-form during the stretching process, the alpha-form having a higher density than the beta-form from which it is derived. The development of porosity during the stretching process is accompanied by a significant reduction in apparent film density and the films become opaque with a high degree of whiteness.

More recently it has been proposed in EP 0632095, which is incorporated herein by reference, to use a variety of organic amides as beta-nucleating agents in the formation of mono- and biaxially stretched polypropylene films. A melt of a mixture of polypropylene and the beta-nucleating agent are cast into a film web which is allowed to crystalize at a temperature of 15 to 140° C. to form a solid web containing the beta-form of polypropylene. The web is then mono- or biaxially stretched at a temperature above 20° C. but less than the melting point of the beta-form crystals in the web. The resulting stretched films are said to have high whiteness and hiding power combined with printability and writeability.

Microvoid formation during the plastic deformation of the beta-form of polypropylene is also described in the journal POLYMER (Vol. 35, No. 16, pp. 3342–5, 1995, and Vol. 36, No. 13, pp. 2523–30, 1995) which is incorporated herein by reference. Porosity is said to increase with higher crystallization and lower stretching temperatures. All samples containing the beta-form apparently become opaque when stretched at temperatures below 120–130° C.

Opacity due to microvoid formation also occurs when propylene homopolymers are blended with a variety of incompatible particulate materials and are then biaxially stretched, numerous examples of this being known from the prior art. Typically, phase distinct organic or inorganic materials with a particle size of 1 to 10 μm are used to impart opacity.

In the present invention, the polypropylene-based resin or polypropylene based polymer can be any resin or polymer containing propylene units, generally at least 50% by weight of propylene units, preferably 80–100% by weight of propylene, for example 95–100% by weight of propylene, in each case based on the total polymer weight. The polypropylene-based polymer is preferably a propylene homopolymer or a random or block copolymer or terpolymer containing a major proportion (80–100wt %) of units derived from propylene, the remainder being ethylene or butylene and having a crystallinity of at least 40% preferably 50 to 90%. Usually the polypropylene based polymer has a melting point of 140–170° C., preferably 155–165° C. and a melt flow index (DIN 53 735 at 21.6 N and 230° C.) of 1.0–10 g/10 min, preferably 1.5–6.5 g/10 min. Most preferred is isotactic propylene homopolymer containing about 100% propylene units and a melting point of 160–162° C.

The nucleating agent used to induce the formation of the beta-form of the polypropylene of the base layer can be selected from those proposed hitherto for the purpose. Any desired nucleating agent or agents can be used. However, particularly good results have been achieved using amides as proposed in EP 0632095, (hereby incorporated by reference) and more particularly N,N'-dicyclohexyl-2,6-naphthalene dicarboxamide.

The amount of nucleating agent used to induce the formation of the beta-form of polypropylenes can be varied, for example from 0.0001 to 5 wt %, preferably from 0.001 to 2 wt % of the nucleating agent based on the weight of polypropylene, as described in EP 0632095, particularly preferred amounts being from 0.001 to 1 wt %.

The polypropylene should have sufficient amounts of the beta-form so as to form the desired amount of microvoids, and to give the desired opaque appearance when the films is stretched.

Films used to form labels in accordance with the present invention can suitably consist of a single layer of a polypropylene-based resin containing microvoids, but they can also include one or more further layers, for example, to impart particular properties to the labels. The films can, for example, include an outer printable layer, and this outer layer can be in direct contact with the voided polypropylene base layer, or can be an outer layer on one or more intermediate layers on the base layer.

Further layers if included are preferably formed from polyolefins, but can be suitably formed of any material. Examples of polymers which can be used for this purpose include polymers containing units derived from one or more of ethylene, propylene, butene-1, and higher aliphatic alpha-olefins, and blends of such polymers. Other polymeric materials which can be used for these further layers include acrylic polymers and polyolefins extended with unsaturated carboxylic acids and derivatives thereof, for example, acid ionomers and anhydrides.

The voided polypropylene-based resin layer of labels of the present invention will usually have a further layer on one surface thereof, such as heat-sealable layer. However, the other surface of the polypropylene-based layer need not have any further layers thereon. The absence of an output layer can be used, for example, to exploit the often present surface roughness of the base layer which can aid labelling. However, this other surface of the base layer can have one or more polymeric layers thereon, for example, a heat sealable layer which can be the same as or different from the optional layer on the outer surface of the film. Preferred materials for this layer can suitably be selected for copolymers referred to above.

Films used to form labels in accordance with the present invention can also optionally include one or more additives used in the polyolefin art, for example, slip agents, antistatic agents, antiblock agents, neutralizing agents, stabilizers, UV absorbers, and/or pigments. Such additives, if included, are preferably present in amounts which do not significantly adversely affect the ability of the polypropylene to crystalize in the beta-form. When additives are present, they can be added to one or more of the layers of the film. When an antistatic agent is added to films used to produce labels in accordance with the present invention, the total amount of added antistatic agent is preferably not more than 1 wt % based on the total weight of the film.

In accordance with the invention, no external additives, such as calcium carbonate or other void-initiating particles like polyethylene terephthalate (PET) or titanium dioxide or other white pigments are needed to give an opaque film. External additives are additives other than polypropylene and being incompatible with polypropylene and causing formation of voids upon stretching.

Films used to make labels in accordance with the present invention can be produced using known methods. For example, the films can be made by extrusion or coextrusion through a slot die of melts of the appropriate polymers for the layer or layers which may be desired, to form a polymer web which is cooled and thereafter sequentially biaxially stretched. However, layers other than the voided layer can be applied to the polypropylene based resin layer by coating after the voided polypropylene layer itself has been formed.

It is generally desirable to carry out certain of the processing steps, particularly the initial crystallization of the polypropylene from a melt containing the beta-forming nucleating agent, under conditions which will bring about the formation of the desired film structure. More particularly, the cooling should be preferably effected under conditions such that the beta-form of polypropylene is produced and void formation can occur during subsequent stretching of the films.

The cooling or crystallization temperature used to induce the formation of the beta-form of polypropylene in the base layer of films of the present invention prior to stretching should generally be at least 20° C. but less than the melting point of the beta-form of polypropylene. Although temperatures at the lower end of this range, for example up to 50° C., can be used, it is generally preferred to use temperatures of at least 70° C., and still higher temperatures are often preferred, for example 90° C. or more. However, the cooling temperature is preferably not more than 140° C., preferably not more than 130° C. and from practical considerations it is preferably below the temperature at which the film sticks to surfaces used to cool it.

Cooling of the melt can be effected in air of a suitable temperature, but is generally preferred to effect cooling by contacting the extruded web with a cooling surface, for example, a chill roll or by immersing the extruded melt into a cooling liquid.

Subsequent biaxial stretching of the cooled web can be effected under conditions known in the polypropylene film art. Stretching is preferably effected sequentially, thus enabling the conditions used in the two directions to be selected independently of each other. Stretching in the direction of extrusion (the machine direction) will usually be effected before stretching in the transverse direction.

The conditions used to effect stretching in the machine direction have been found to have a substantial effect on microvoid formation, lower stretch temperatures and lower stretch ratios usually leading to increased voiding. A preferred temperature range for stretching in the machine direction is from 70 to 110° C., and more preferably from 80 to 95° C. The stretch ratio used in the machine direction will usually be at least 3:1, and a preferred range is from 3.5:1 to 8:1.

Subsequent stretching of the films in the transverse direction will in general be effected at lower temperatures than are conventionally used for the transverse stretching of polypropylene films, for example, at from 100 to 160° C. However, it is generally preferred to effect stretching in the transverse direction at temperatures of 120° C. to not more than 155° C. and preferably not more than 150° C. in order to produce biaxially stretched films having low densities. The stretch ratio used in the transverse direction is preferably from 3:1 to 10:1, preferably 5:1 to 10:1.

In general it is preferred that the area stretch ratio of film used to produce labels in accordance with the present invention be at least 15:1, and preferably at least 20:1. Much higher area stretch ratios can be used, for example, up to 70:1, but lower area stretch ratios, for example less than 50:1, will usually be used. A preferred range of area stretch ratios is from 25:1 to 50:1. The area stretch ratio is the overall stretching applied to the film. In case of a first stretching lengthwise and a subsequent stretching crosswise the area stretch ratio results from multiplying the stretch ratio lengthwise and crosswise e.g., stretching lengthwise 6:1 and crosswise 8.1 give an area stretch ratio of 48:1.

Either or both surfaces of films used to produce labels in accordance with the present invention are preferably treated to increase their surface energy, and hence their printability, for example, using flame or corona discharge treatment.

Labels in accordance with the present invention can have any desired thickness. The labels of the present invention will usually have thicknesses of from 40 to 80 $\mu$m, although they can, if desired, be thicker or thinner, for example depending on the eventual end use of the labels. In most cases, they will be at least 25 $\mu$m thick. When an outer layer is present on either one or both sides of the voided polypropylene polymer layer, it preferably has a thickness of from 0.2 to 6 $\mu$m, and more preferably from 1.0 to 4.0 $\mu$m.

The following Examples are given by way of illustration only, and do not limit the scope of the invention.

EXAMPLES 1 AND 2

A two layer polymer web was produced by coextruding through a slot die a base layer of propylene homopolymer containing 0.1 wt % of a beta-form nucleating agent (N,N'-dicyclohexyl-2,6-naphthalene dicarboxamide; NJ-Star NU-100, ex New Japan Chemical Co., Ltd.) but no added antistatic agent, with a layer of a propylene/ethylene copolymer (4 wt % ethylene). The homopolymer layer was cooled by bringing it into contact with a chill roll having a surface temperature of 100° C., and the copolymer layer was cooled in the ambient air.

DSC measurements indicated the homopolymer layer contained a high level of the beta-form of polypropylene with $T_m$ of 153° C.

The cooled web was then stretched 4.5:1 times in the direction of extrusion by contacting it with heated rolls at 90° C. and having different peripheral speeds to produce an opaque mono-axially stretched web, DSC showing that virtually all of the beta-polypropylene had been converted into the alpha-form.

The mono-axially stretched web was then stretched 8.0:1 in the transverse direction in a stenter oven either at 128° C. (Example 1) or at 144° C. (Example 2) to produce two biaxially stretched films which were cooled and were then would up into reels. The overall thickness, densities and optical densities of these films are given in Table 1, and in both cases, the single layer of the copolymer was 1 $\mu$m thick.

Both films unwound readily from their respective reels, and samples of the respective films cut into individual labels and formed into stacks were easily removed from the stacks without significant static cling between the labels.

EXAMPLES 3 AND 4

A polymer mono-web was produced by extruding through a slot die a melt of the propylene homopolymer and beta-form nucleating agent used in Examples 1 and 2, again without any added antistatic agent. One surface of the web was either cooled at 100° C. (Example 3) or at 90° C. (Example 4) by contact with a chill roll having its outer surface at the appropriate temperature, the other surface of the web being cooled in the ambient air.

Each of the cooled webs were then stretched 3.5:1 in the direction of extrusion by passing them over heated rolls at either 80° C. (Example 3) or 90° C. (Example 4) to produce opaque monowebs.

The mono-axially stretched webs were then stretched 6.0:1 in the transverse direction using a stenter oven at either 153° C. (Example 3) or 135° C. (Example 4) to produce two biaxially stretched films which were cooled and then wound up into reels. The overall thicknesses, densities and optical densities of these films are given in Table 1.

Both films unwound readily from their respective reels, and samples of the respective films cut into individual labels and formed into stacks were easily removed from the stacks without significant static cling between the labels.

TABLE 1

| Ex. | Chill Temp (° C.) | MD Temp (° C.) | Stretch Ratio (x:1) | TD Temp (° C.) | Stretch Ratio (y:1) | Overall Film Thickness ($\mu$m) | Optical Density | Density (g/cm$^2$) |
|---|---|---|---|---|---|---|---|---|
| 1 | 100 | 90 | 4.5 | 128 | 8 | 71 | 0.55 | 0.92 |
| 2 | 100 | 90 | 4.5 | 144 | 9 | 57 | 0.61 | 0.87 |
| 3 | 100 | 90 | 3.5 | 153 | 6 | 47 | 0.78 | 0.59 |
| 4 | 90 | 90 | 3.5 | 135 | 6 | 73 | 0.64 | 0.87 |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included with the scope of this invention.

Great Britain Application 9705509.9 filed Mar. 18, 1997, the priority document of the present application, is hereby incorporated by reference in its entirety.

What is claimed is:

1. A process for producing a polymeric label, comprising:
   (a) forming a film by extruding a melt of propylene homopolymer and a beta-form nucleating agent;
   (b) cooling the melt to form a polymer web, such that the beta-form of polypropylene is produced;
   (c) stretching the web containing the beta form of polypropylene to form a film containing microvoids;
   (d) cutting the film into labels,
      wherein said label includes less than 1% by weight of antistatic agent based on the total weight of the label, and
      wherein said label is suitable for use in a labeling process in which individual labels are formed into a stack from which the individual labels are removed as required.

2. The process of claim 1, wherein the labeling process is an in-mold labeling process.

3. The process of claim 2, wherein the film containing microvoids is a base layer, one surface of which base layer does not have any further layers thereon such that the film containing microvoids provides a surface roughness which aids labelling, and the other surface of which base layer can have one or more polymeric layers thereon.

4. The process of claim 1, wherein the film containing microvoids is a base layer, one surface of which base layer does not have any further layers thereon such that the film containing microvoids provides a surface roughness which aids labelling, and the other surface of which base layer can have one or more polymeric layers thereon.

5. A label stack formed from pre-cut labels,
   wherein the labels are made from a label film comprising a layer of propylene polymer resin having microvoids therein, the microvoids having been formed by stretching a web containing the beta-form of polypropylene to thereby produce a microvoided layer,
   wherein one surface of said microvoided layer does not have any further layer thereon such that said surface of the microvoided layer provides a surface roughness which aids labelling; and
   wherein the other surface of said microvoided layer has one or more polymeric layers thereon.

6. A label stack according to claim 5, wherein the beta-form of polypropylene of the microvoided layer of the label film is produced by crystallizing the propylene polymer resin in the presence of a beta-form nucleating agent.

7. A label stack according to claim 6, wherein the nucleating agent of the microvoided layer of the label film comprises N,N'-dicyclohexyl-2,6-naphthalene dicarboxamide.

8. A label stack according to claim 5, wherein the other surface of the label film having one or more further polymeric layers thereon has been treated to increase its surface energy.

9. A label stack according to claim 5, wherein the label film includes no antistatic agent.

10. A label stack according to claim 5, wherein the label film has been biaxially stretched.

11. A label stack according to claim 10, wherein the label film is formed by sequentially biaxially stretching.

12. A label stack according to claim 5, wherein the label film has a thickness of from 40 to 80 $\mu$m.

13. A label stack according to claim 5, wherein the label film has been subjected to an area stretch ratio of at least 15:1.

14. A label stack according to claim 5, wherein the label film comprises one or more of a slip agent, an antistatic agent, an antiblock agent, a stabilizer, a UV absorber, or a pigment.

15. A label stack according to claim 5, wherein the label film includes less than 1% by weight of antistatic agent based on the total weight of the label.

16. A label stack according to claim 5, wherein the microvoided layer of the label film includes no void-initiating particles.

17. A label stack according to claim 5, wherein the microvoided layer includes no opacifying pigments.

18. A process for labeling an article, the process comprising forming a label stack as set forth in claim 5, and removing individual labels from said label stack as required to be added to the article to be labeled.

19. The process according to claim 18, wherein the process comprises an in-mold labeling process.

20. A method of making a label stack as claimed in claim 5, the method comprising:
   (a) forming a film comprising the beta-formed of polypropylene;
   (b) stretching the film to form microvoids;
   (c) cutting the film into labels; and
   (d) stacking the pre cut labels.

* * * * *